Dec. 17, 1963   P. COSTE   3,114,172
METHOD AND APPARATUS FOR MANUFACTURE OF HOLLOW BODIES
Filed Dec. 18, 1961   4 Sheets-Sheet 1
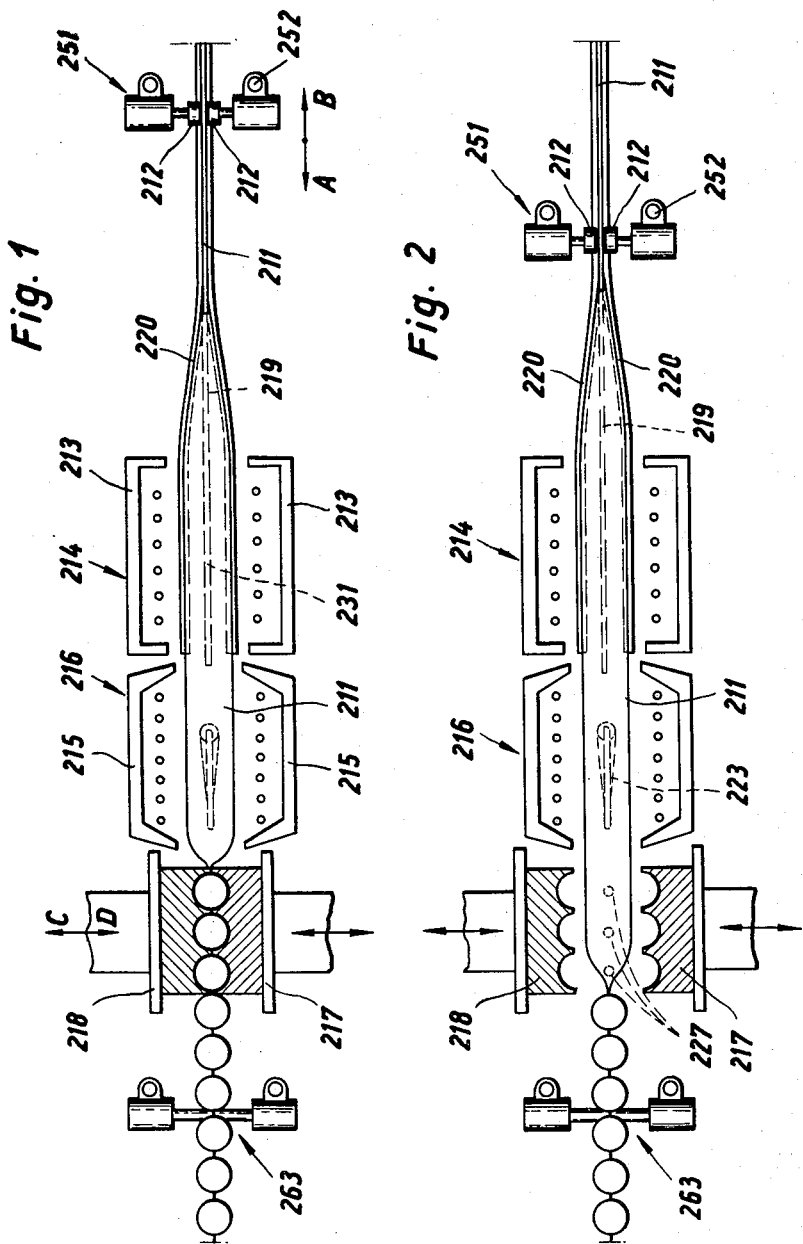
Inventor:
Peter Coste,
By Edward P. Marmorek,
His Attorney.

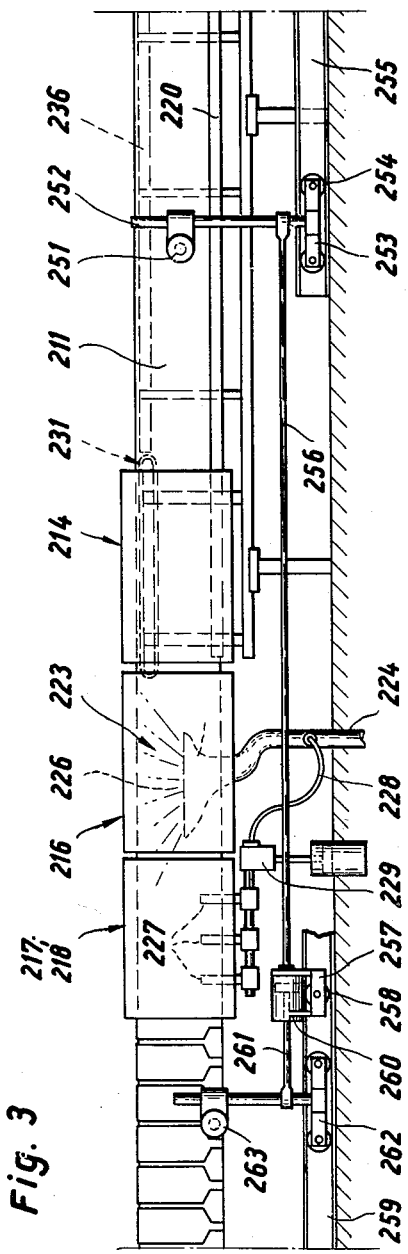
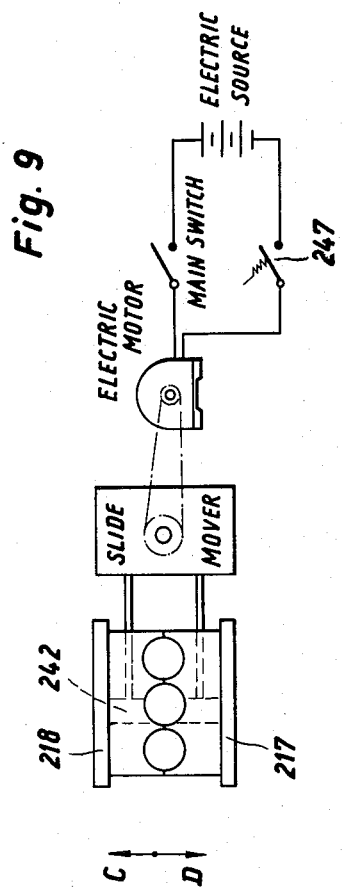

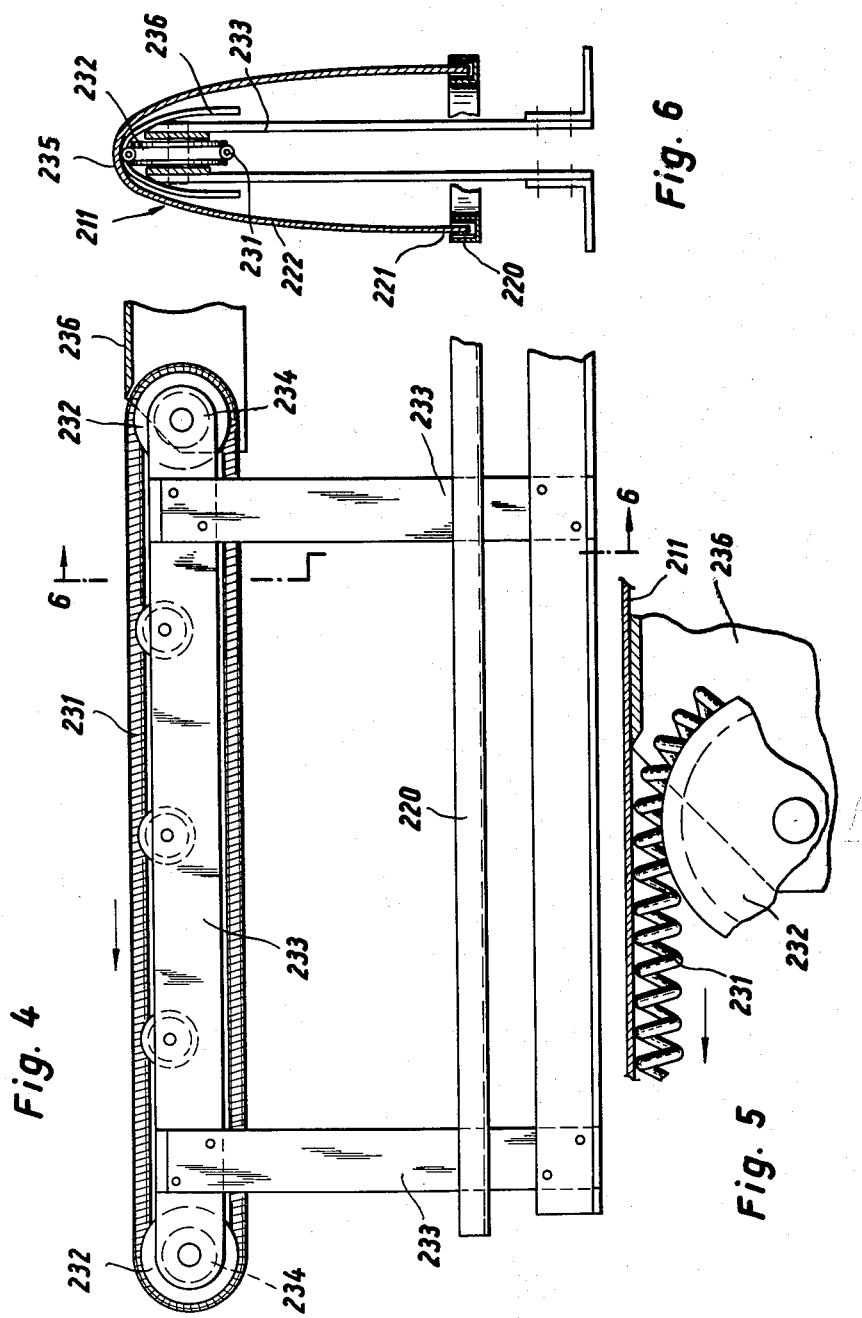

United States Patent Office 3,114,172
Patented Dec. 17, 1963

1

3,114,172
METHOD AND APPARATUS FOR MANUFACTURE
OF HOLLOW BODIES
Peter Coste, Ligornetto, Tessin, Switzerland, assignor to
Rhenopack G.m.b.H., Ludwigshafen (Rhine), Germany,
a corporation of Germany
Filed Dec. 18, 1961, Ser. No. 160,194
Claims priority, application Germany Sept. 28, 1961
12 Claims. (Cl. 18—19)

The invention relates to the manufacture of hollow bodies, such as bottle-shaped bodies having a thin wall of thermoplastic sheet material. The thermoplastic sheet material may, for instance, be polyethylene sheet material, or foil, or other hard thermoplastic sheet material free from any softener, for example of the type known as PVC sheet material, or similar suitable thermoplastic sheet material. Thus, wherever the description refers to foil, other thermoplastic sheet material may be considered instead.

The invention relates more particularly to machines for the automatic manufacture of shaped hollow bodies and to methods of making them.

It is among the principal objects of the invention to provide machines for the manufacture of shaped hollow bodies which work efficiently and substantially trouble-free with but minimal supervision.

It is another object of the invention to provide methods for the shaping of hollow bodies.

Further objects and advantages of the invention will be set forth in part in the following specification and in part will be obvious therefrom without being specifically referred to, the same being realized and attained as pointed out in the claims hereof.

Reference is being made to the co-pending application of Helmut Lang, Ser. No. 800,039, filed March 17, 1959, now Patent No. 3,013,301 issued December 19, 1961. The instant invention is in the nature of an improvment of the aforesaid application Ser. No. 800,039.

FIG. 1 is a schematic fragmentary plan view of a machine embodying the instant improvement, with the dies shown closed;

FIG. 2 is a plan view similar to FIG. 1, but showing the dies open;

FIG. 3 is a schematic fragmentary front elevational view, partly in section, of the machine of FIGS. 1 and 2;

FIG. 4 is a large scale fragmentary schematic elevational view showing a detail;

FIG. 5 is a large scale fragmentary sectional view of a detail;

FIG. 6 is a large scale sectional view taken on the line 6—6 of FIG. 4;

FIG. 9 is a schematic view showing a wiring diagram.

Figure 7:
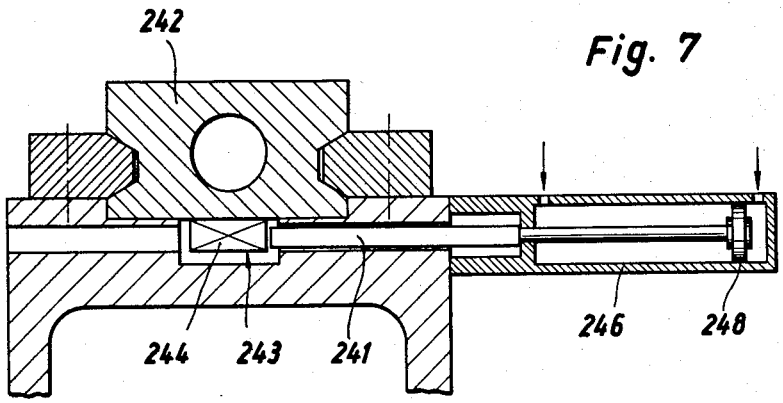
FIG. 7 is a large scale sectional view of the guiding mechanism for the clamping dies, taken on the line 7—7 of FIG. 8.

In the front portion of the machine which is defined by the entrance of the starting or raw material into the machine there is disposed the foil feeding and forming station which is followed by the heating station, the hollow body forming station, and the cutting and ejecting station for the hollow bodies.

2

Referring now to FIGS. 1-3, the U-bent tape of thermoplastic sheet material 211 is transported by means of grippers 212 and 212′, which are operated similar to the grippers 44. The sheet 211 is thus transported in a step-by-step manner through the machine. There is provided a first heating means, such as a first heater 214 which has two opposite heating members 213. As the material 211 is propelled stepwise in the direction of the arrow A of FIG. 1, it will first come into the first heater 214. In that first heater, the sheet will be preheated to a preheating temperature which is below the softening temperature of the material. For instance, where low pressure polyethylene sheet material is used, it will be heated by the preheater 214 to a temperature of about 110° C., at which temperature it still retains its form.

Subsequently, the sheet 211 will pass in its stepwise motion in the direction A into a second heating means 216, which comprises opposite heating members 215 which are arranged adjacent the preheating members 213. In the heater 216, the sheet 211 will be subjected to a heating temperature above the softening point of the sheet materal used, so that it becomes plastically deformable for subsequently deforming in the forming device. For instance, where low pressure polyethylene is used, it will be heated in the heater 216 to a temperature from 130° C. to 150° C., at which temperature it appears transparent and loses its constancy. Either heater 214 or 216 may have the members movable in opposite directions as shown there or in a similar manner guided by similar means.

Adjacent the heater 216, in the direction A, there is provided a forming device or forming and clamping die 218 which is composed of two parts 217 which are guided for reciprocal movement in opposite directions C and D transverse of the direction A.

The two parts 217 of the forming device or die 218 may be driven and gudied for opposite reciprocal movement in a manner similar to that shown in FIGS. 9 and 10.

A support 219 (FIGS. 3, 6) is provided for supporting the U-shaped tape 211, for instance before it reaches the preheater 214. The support 219 comprises a horizontal rail 219a along which there extend two elongated guides 220. The rail of the support 219 suspends the topmost part 235 of the tape 211 while the lower edges 221 of the sides 222 of the tape 211 are guided by the guides 220.

A special suspension means may, for example, be provided instead of the support 219 for suspending the tape 218 in the preheater 214 from a point slightly ahead of the preheater 214. Such a special suspension means may include an endless movable carrier 231 to transport the tape from a point just before the preheater 214 to the end of the preheater 214 in the direction A. The carrier 231 comprises an endless band which is composed of a wire helix or a helix of other thread, such as synthetic thread or wire sheathed in a synthetic material of the type which would not adhere to the heated sheet material 211 which is suspended between two rolls 232 (FIG. 4). The rolls are supported in the center on legs 233 centrally of the machine. The rolls 232 have anti-friction bearings 234 for easy rotation.

A guide 236 is mounted in front of the band 231, which is preferably U-shaped and serves to guide the tape 211 safely onto the band 231. The guide 236 preferably is made of corrugated sheet metal so as to avoid a flush contact between the tape 211 and the guide 236. The guides 220 likewise may be corrugated sideways of the direction A, to avoid flush contact with the edges 221 of the tape 211.

The tape 211 is freely suspended between the leading end of the preheater 214 and the leading end of the forming device 218. In order to avoid that the tape 211 is hanging through too much, there is provided a blow device 223 which comprises (FIGS. 2 and 3) a pipe 224 and a blower 225 which has an elongated exit 226. Hot air emanating in a jet stream from the exit 226 will form an air cushion underneath the suspended tape 211 to keep the hanging down of the freely suspended tape portion to a minimum. Instead of the aforesaid blower with elongated exit 226 there can be used a horizontal pipe with a series of orifices or nozzles.

The mouth pieces 227 of the forming device 218 which correspond to the mouth pieces 101 of FIG. 3, are controlled by a valve 229, and hot air may be expelled through the mouth pieces or nozzles 227 in support of the blow device 223. Thus, conduits are provided which, as controlled by the valve 229, will alternatively force through the nozzles 227 either compressed air for body forming in the closed mold, or respectively hot air to augment the air cushion effect created by the blower 225.

The blow device 223, of course, does not extend into the space between the forming parts 217. The length in the direction A of the preheater 214 and the heater 216 is proportional to the feeding distance of the tape 211 during each propelling impulse, so that the tape 211 will leave the heater 216 at the prescribed temperature.

The forming device performs the dual function of fusing along its edges the sheet material parts to form a hollow body and to serve as a mold when air pressure is delivered to the inside of the hollow body. For the fusing to seal the edges, the pressure between the two die parts need to be but a fraction of the pressure holding the die parts together in taking up the deforming pressure blown into the interior of the hollow body between the die parts.

Figure 8:
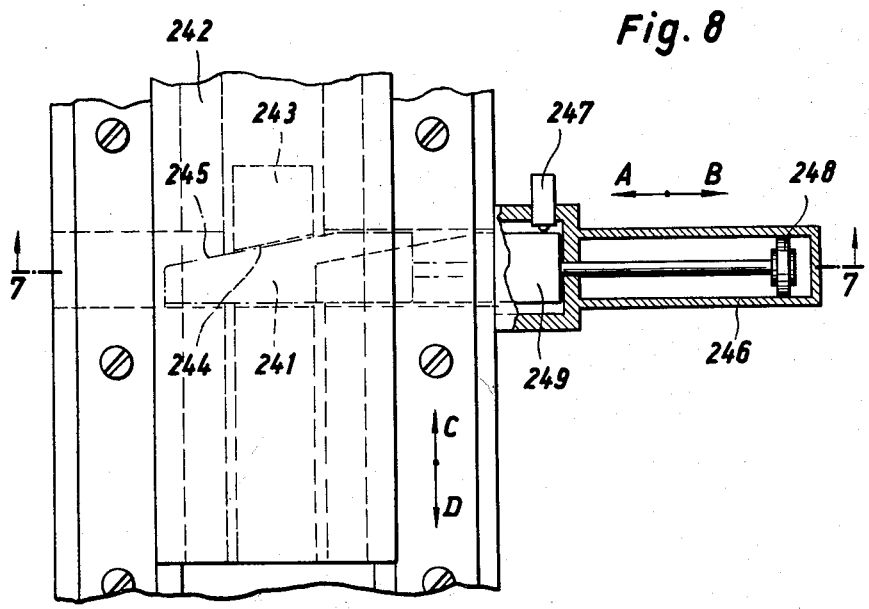
FIG. 8 is a fragmentary plan view showing a detail of the guide mechanism for the clamping dies and the blocking means therefor.

The instant invention therefore provides that, while the parts 217 may be moved and held as shown in FIGS. 9 and 10, they may be blocked during the blowing operation inside the forming device as shown in FIGS. 7 and 8. Each die part 217 is carried on a slide 242 which is movable in the opposite directions C, D. The slide 242 carries a nose 243 secured thereto which terminates in an inclined surface 244. A wedge 241 is movable in the opposite directions A, B at right angle to the directions C, D and carries a surface 245 that is inclined as the surface 244. The wedge 241 is movable into and out of the path of the nose 243, thereby to block the path of the slide 242.

Means are provided for reciprocally moving the wedge 241, such as a pneumatic cylinder 246 which energizes a piston 248 thereof to which there is connected the wedge 241. The cylinder 246 and piston 248 cause reciprocation in the direction A, B of the wedge 241, in order to block the slide 242 during a certain period of time in the operation of the machine.

A part 249 connected to the piston 248 is operative to trip an electric switch 247 in such a manner that, when the slide 242 is blocked, the electric current (see FIG. 9) for the energization to drive the slide 242 is interrupted, thereby preventing that the slide 242 is retracted when the wedge 241 is in the projected position. In FIG. 7, the wedge 241 is shown in the retracted position.

As best shown in FIG. 3, the front grippers 251, which correspond to the previously described grippers 44 are held in supports 252 which are carried by a slide 253 which is guided in rails 255 by means of rolls 254. The slide 253 is connected to another slide 257 by means of a connecting rod 256. The slide 257 projects approximately into the area of the forming device 218, and has rolls 258 which are guided in rails 259.

On the slide 257 there is mounted an hydraulic cylinder 260 which has a piston rod 261 that is connected to a slide 262 which carries rear grippers 263.

The stroke of the piston rod 261 is adjustable so that at the end of the transport feed of the tape 211 there will occur stretching to a predetermined extent in the direction A of the part 211 heated in the heater 216. During the retraction stroke of the transporting device, the cylinder 260 will retract the slide 262 against the slide 252 into the initial position.

Having thus described the invention, what is claimed as new and desired to be secured by Letters Patent, is as follows:

1. In a method of continually forming hollow bodies from thermoplastic material in form of a sheet, the steps comprising continually feeding the sheet stepwise substantially horizontally throughout, folding the sheet so that the crease will be on top and the open side below, thereafter preheating the sheet to a preheating temperature below the softening temperature, subsequently heating the sheet to a temperature above the softening temperature, and immediately subsequently forming the sheet, and blowing against the open side of said folded sheet from below for air cushion suspension thereof immediately prior to the forming.

2. In a method as claimed in claim 1, the forming including blowing with compressed air, and heating said compressed air for increasing the air cushioning effect by the compressed heated air normally used for forming.

3. In a method as claimed in claim 1, together with the step of continually stretching the stepwise moving tape close to the forming thereof.

4. In a method of continually forming hollow bodies from a polyethylene sheet, the steps comprising continually feeding the sheet stepwise substantially horizontally throughout, folding the sheet, so that the open side will be below thereafter preheating the sheet to a preheating temperature of about 110° C., subsequently heating the sheet to a temperature of from 130° C. to 150° C. and immediately subsequently forming the sheet, and blowing against said open side of the sheet from below for air cushion suspension thereof immediately prior to the forming.

5. In a machine, for use in the manufacture of hollow bodies having thin walls of thermoplastic sheet, a transport device propelling an inverted U-shaped folded thermoplastic sheet in a step-by-step manner throughout a path in the machine, a preheater adjacent said path operable to heat the sheet to a preheated temperature below the softening temperature of the sheet, a heater disposed downwardly of the preheater along said path and operable to heat said sheet to a temperature above the softening temperature, a forming device disposed downwardly along said path and including two oppositely movable parts, and means suspending said sheet substantially horizontal including a blower and a series of mouth pieces fed from said blower and disposed below said path throughout a substantially horizontal portion thereof and operable to suspend the sheet of said portion of the path from below by jet stream action directed upwardly against the open side of the folded sheet.

6. In a machine as claimed in claim 5, said transport device including grippers operable to engage said sheet for step wise feeding thereof and comprising a fluid cylinder and piston having adjustable piston stroke.

7. In a machine as claimed in claim 5, blowing nozzles disposed in said forming device, blow conduits and a valve operable for alternatively directing compressed air and heated air through said nozzles for forming and respectively suspension action.

8. In a machine as claimed in claim 5, comprising support means for said sheet including an endless band, rolls suspending said band, said band including a thread helix supporting the apex of the U-shaped thermoplastic sheet.

9. In a machine as claimed in claim 5, together with support means comprising two corrugated guides arranged sidewise and operable to support the suspended edges of the U-shaped sheet.

10. In a machine as claimed in claim 5, a slide for each forming device part, said slides being moved in opposite directions transverse of the feed direction, and wedge means operable to block the slide path when the forming device is closed.

11. In a machine as claimed in claim 10, together with fluid operated energizing means for reciprocating said wedge.

12. In a machine as claimed in claim 11, an electric circuit operable for energizing the movement of said slides to close and open the forming device respectively, and including a switch disposed in the path of said fluid operated energizing means, said energizing means being operative to trip said switch for interrupting said circuit when said wedge is in the slide blocking position.

References Cited in the file of this patent

UNITED STATES PATENTS

| | | |
|---|---|---|
| 2,918,698 | Hagen et al. | Dec. 29, 1959 |
| 2,919,462 | Friden | Jan. 5, 1960 |
| 2,928,124 | Hugger | Mar. 15, 1960 |
| 3,008,865 | Hayes et al. | Nov. 14, 1961 |
| 3,013,301 | Lang | Dec. 19, 1961 |